United States Patent [19]

Leiher et al.

[11] Patent Number: 4,457,117
[45] Date of Patent: Jul. 3, 1984

[54] MODULAR ROOM DIVIDER SYSTEM

[75] Inventors: Alfred J. Leiher, Hacienda Heights; Daniel Schmid, Long Beach; Myrl D. Pierce, Downey, all of Calif.

[73] Assignee: Benedetti Corporation, Los Angeles, Calif.

[21] Appl. No.: 378,073

[22] Filed: May 14, 1982

[51] Int. Cl.³ .................. F04H 1/00; F16B 13/00
[52] U.S. Cl. ..................... 52/238.1; 52/239; 52/127.12; 403/44; 403/45; 403/294
[58] Field of Search ............... 403/44, 45, 294; 52/238, 239, 127.12, 584, 582

[56] References Cited

U.S. PATENT DOCUMENTS

| | | | |
|---|---|---|---|
| 197,721 | 12/1877 | Cornell | 403/44 |
| 214,536 | 4/1879 | Wares | 403/44 |
| 215,348 | 5/1879 | Gregg | 403/294 |
| 338,811 | 3/1886 | Whittaker | 403/44 |
| 1,055,021 | 3/1913 | Colson | 52/127.12 |
| 1,165,155 | 12/1915 | Coroes | 403/294 |
| 1,423,202 | 7/1922 | Fellows | 403/44 |
| 2,186,953 | 1/1940 | Bohnsack et al. | 52/584 |
| 2,225,612 | 12/1940 | Allen | 52/586 |
| 2,392,551 | 1/1946 | Roe | 52/573 |
| 2,741,808 | 4/1956 | Rasmussen | 52/127.12 |
| 2,781,657 | 2/1957 | Taylor | 52/238.1 |
| 2,832,101 | 4/1958 | Stark | 52/582 |
| 2,928,273 | 3/1960 | Rheinstein | 52/584 |
| 3,017,970 | 1/1962 | Nickols | 52/127.12 |
| 3,251,163 | 5/1966 | Russell | 52/238.1 |
| 3,890,053 | 6/1975 | Strecker | 403/44 |
| 3,990,204 | 11/1976 | Haworth et al. | 52/239 |
| 4,200,254 | 4/1980 | Nelson | 52/239 |

OTHER PUBLICATIONS

Sears Roebuck & Co.; Turnbuckles MY 72492.
Harvey Probber, Inc.; 1978 "Advent III, Interior Architecture for Office Planners".
Pleion Corp.; Sept. 1, 1981 "Installation Procedures".
Group Artec; "Office Systems/Furniture Installation Manual".
Acme Landscape Group; "Installation Manual".
Unigroup by Haworth; "Planning for Tomorrow".

Primary Examiner—John E. Murtagh
Assistant Examiner—Michael Safavi
Attorney, Agent, or Firm—Paul D. Supnik

[57] ABSTRACT

A modular room divider system has plural upright juxtaposed panels having cylindrical anchor receiving apertures disposed about upright axes in the panels top and bottom surfaces. A coupling assembly has a pair of spaced apart anchors mating with the anchor apertures. Threaded portions having opposingly directed right and left hand threads extend inwardly from the anchors and are centrally engaged by an internally threaded sleeve having adjacent right and left hand threaded portions. The sleeve has a square prismoidal exterior surface and is traverseable by a notched wheel having a mating central aperture. A channel extends from the anchor apertures to the edge of each channel.

In use, two panels are assembled by placing them in juxtaposition. The coupling assembly is placed in alignment over the panels, the anchors being lowered into the anchor apertures and the threaded portions over corresponding channels. The wheel is rotated causing opposing axial movement of the threaded portions, thereby moving the anchors and the panels toward each other, the anchors distributing the tensile load upon tightening transversely across the panel. A similar coupling assembly is placed on the bottom of the panels and similarly tighted.

14 Claims, 7 Drawing Figures

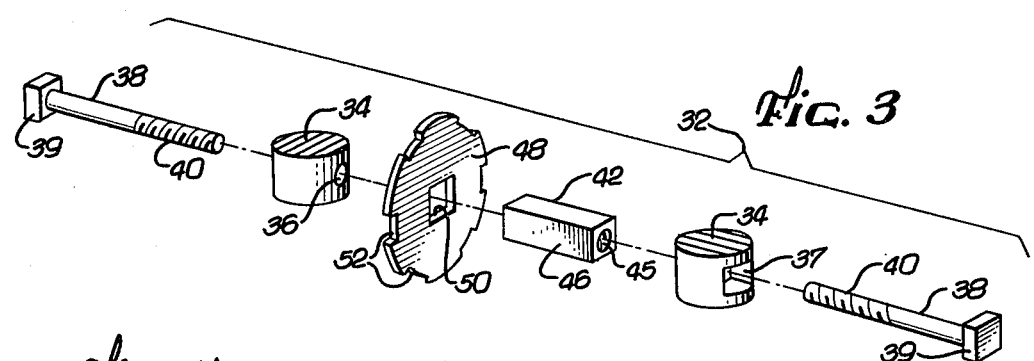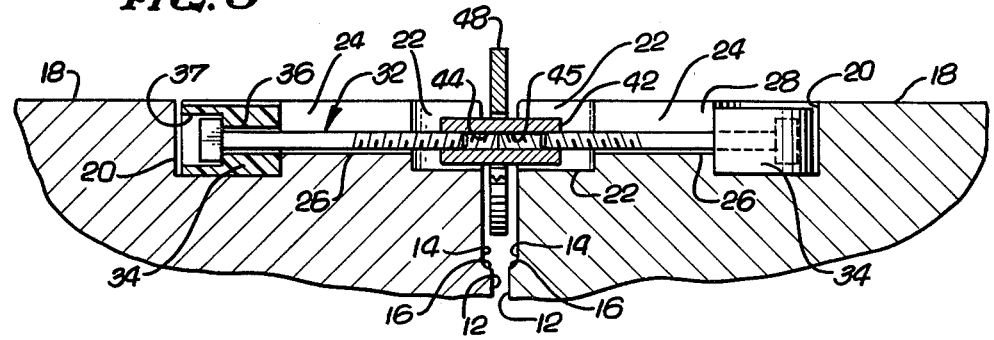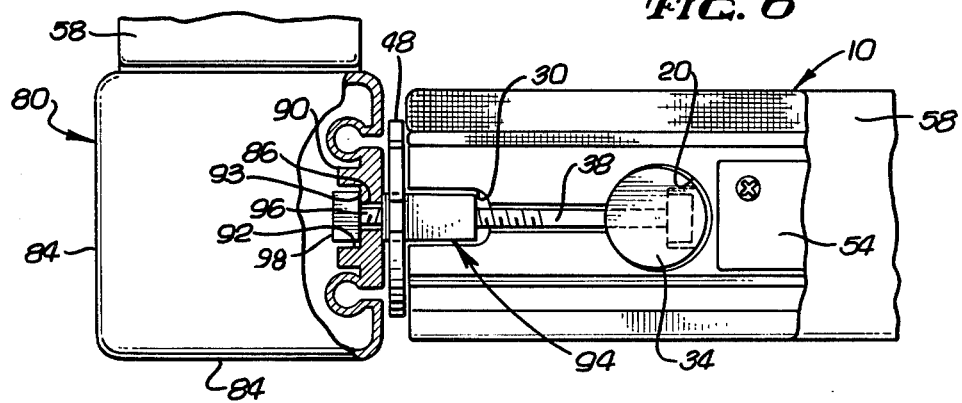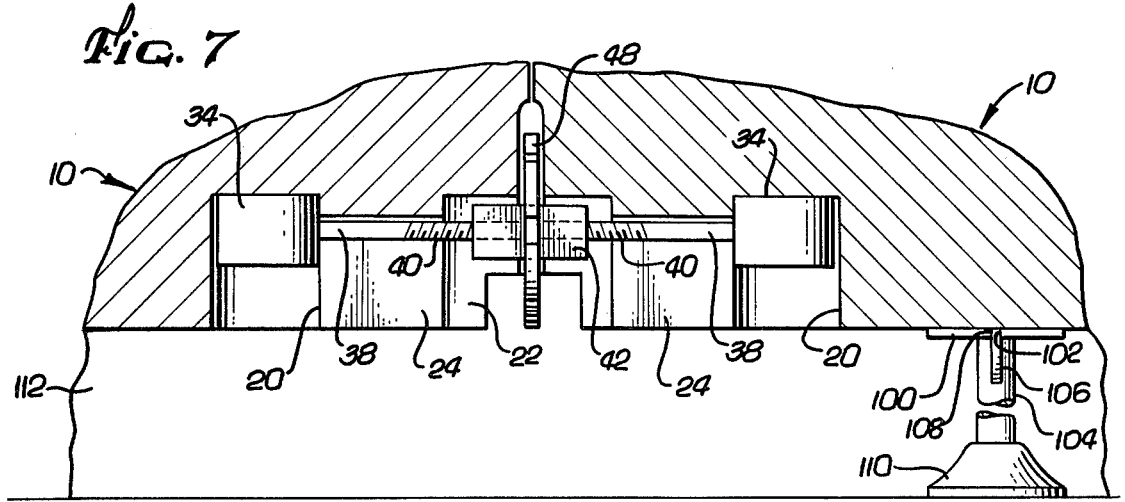

MODULAR ROOM DIVIDER SYSTEM

BACKGROUND OF THE INVENTION

1. Field of the Invention

This invention pertains to room divider systems. More particularly, the invention relates to modular panel arrangements primarily for use in achieving visual and accoustical privacy in office interiors.

2. Description of the Prior Art

Office space is frequently provided which lacks partitioning for individual cubicles. Preexisting office space may be divided with inappropriate sized and configured partitions. Rearrangement of the positioning and the location of office cubicles is beneficial from time to time. This is generally accomplished by unbolting and separating preexisting partitions or other room divider systems. Various connectors have been used, but often multiple types of connectors are required and many tools may be needed to properly install a new arrangement. The rearrangement procedure can be time consuming and inconvenient. It may be desirable to rapidly change the rearrangement of the room dividers to create a temporary office space or to visually experiment with existing space.

SUMMARY OF THE INVENTION

A modular room divider system in accordance with this invention generally comprises first and second juxtaposed upright modular panels each having anchoring apertures. A coupling arrangement comprising two spaced apart anchors matable with the panel's anchoring apertures each have extending threaded portions. A central elongated sleeve having internal threads engages the threaded portions of the anchors. Means are provided for rotating the sleeve to cause the spaced apart anchors to be moved towards each other or away from each other, depending upon the direction in which the sleeve is rotated. When the anchors are disposed in the anchor apertures of the respective panels, rotation of the sleeve causes the panels to move towards one another and tightening of the sleeve causes linkage of the modular blocks.

In a more specific example of the invention, the anchors are cylindrical and bolts are embedded in, and extend radially from the anchors. The bolts have opposing threads and the internal threads of the sleeve have portions in opposing directions. Channels are provided from the anchoring apertures to the edges of the panels for receiving the threaded portions and rotatably receiving the sleeve.

Additional features in accordance with this invention include an upright post for joining panels at right angles and for terminating a series of juxtaposed panels. A circular notched wheel is provided for rotating the sleeve. The wheel has an aperture mating with the exterior sleeve surface whereby the wheel is allowed to move along the sleeve so that precise positioning of the sleeve is not needed to cause proper engagement of the modular panels. Adjacent the side of the panel, a recessed upright surface provides a space for receiving the circular wheel. A horizontally disposed clad has a latch mating with a latch on the top of the panel for removably covering the coupling assembly.

BRIEF DESCRIPTION OF THE DRAWINGS

The nature of the invention described herein may be best understood and appreciated by the following description taken in connection with the accompanying drawings in which:

FIG. 3 is an exploded detail view of the coupling assembly depicted in FIG. 1 in accordance with this invention;

FIG. 5 is a cross-sectional view taken along lines 5—5 of FIG. 1;

FIG. 6 is a plan view with portions exposed and portions removed of the invention depicted in FIG. 1; and FIG. 7 is a detailed cross-sectional view of a portion of the invention depicted in FIG. 1.

DETAILED DESCRIPTION

Figure 1:
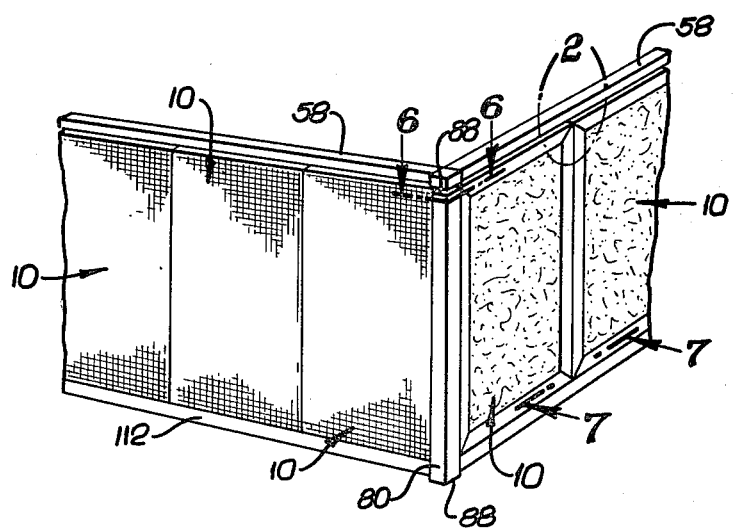
FIG. 1 is a perspective view of a modular room divider system in accordance with this invention.
Figure 2:
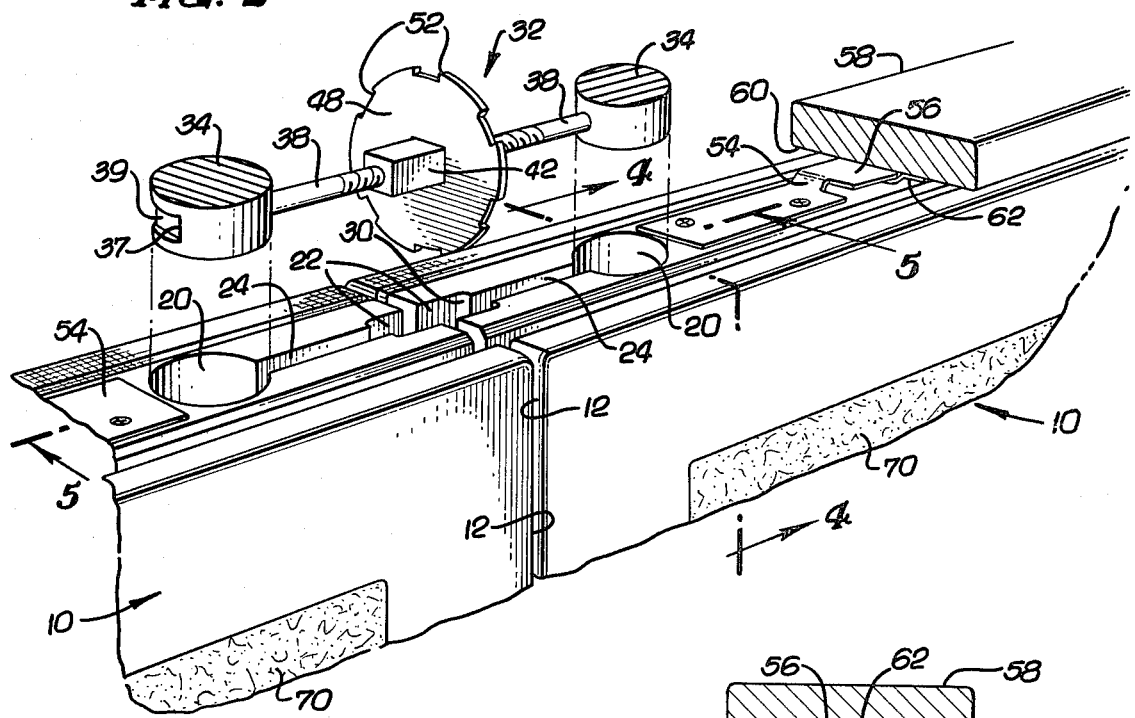
FIG. 2 is an exploded detailed perspective view with portions broken away and portions removed of the invention depicted in FIG. 1.
Figure 4:
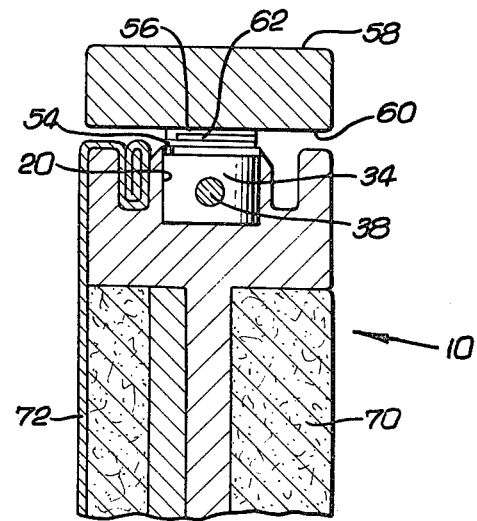
FIG. 4 is a cross-sectional view taken along lines 4—4 of FIG. 1.

Referring generally to FIGS. 1, 2, 3, 4, 5, 6 and 7, a modular room divider system in accordance with this invention generally comprises upright modular blocks or panels 10 defining a vertical planes. The panels 10 generally comprise wood or composite material. Each panel 10 has upright edges 12 transverse to the plane of the panel 10 and an upright recessed surface 14 parallel to the edges 12 and spaced inwardly from the edges 12, thereby defining a transverse narrow ledge surface 16. Extending from a top surface 18 normal to the edges 12 and the plane of the panels 10, an upright cylindrical aperture or bore 20 extends inwardly from the top surface 18. The bore 20 is disposed in spaced apart relationship to the recessed surface 14 and thus to the edge 12 of the block 10.

Adjacent the ledge surface 16 and in communication with the top surface 18 is a laterally disposed U-shaped sleeve channel 22. Somewhat narrower than the sleeve channel 22 but adjacent thereto is a bolt channel 24 which comprises a lateral surface 26 and two upright facing side surfaces 28 extending to the top surface 18 of the panels 10. The bolt channel 24 communicates between the sleeve channel 22 and the bore 20. Limiting funnel surfaces 30 extend opening into the bolt channel 24 from the sleeve channel 22.

A panel coupling assembly 32 as best viewed in FIG. 3 generally comprises a pair of short cylindrical plugs or anchors 34 typically of molded plastic such as nylon. The anchors 34 have a transverse interior apertures 36 and a square countersunk aperture 37 for receiving a bolt head. Bolts 38 have square heads 39 seated in mating relationship to the countersunk apertures 37 to prevent free rotation of the bolts 38 with respect to the anchors 34. The bolts 38 have opposing right and left hand threads 40 which extend beyond the interior apertures 36 of the cylindrical anchors 34. To distinguish the right from the left handed threads, the anchors 34 are correspondingly color coded as shown by the shaded lines of 34 in FIG. 2. The anchors 34 provide a stress relief for the bolts 38 generally spread across a diameter of the anchors 34 transverse to the panels 10 to allow significant tightening and joining of the panels. The anchors 34 also prevent rotation of the bolts 38.

An elongated square threaded sleeve 42 has opposing right and left hand transverse interior threads 44, 45 extending from opposing ends 42 of the sleeve 42, and a square prismoidal exterior surface 46. Opposite the anchors 34, the threads 40 of bolts 38 are rotatably disposed in mating relationship in the transverse interior threads 44, 45 of the square sleeve 42. The bolts 38 have opposing right and left hand thread directions to mate with the opposing right and left hand threads of the sleeve 42 and so that rotation of the square sleeve 42 causes opposing axial motion of the bolts 38 and thus the anchors 34.

A circular disc or wheel 48 has a central square aperture 50 mateable with and moveable along the prismoidal square exterior surface 46 of the square sleeve 42. The wheel 48 is slideable along the square sleeve 42. The wheel 48 has a plurality of notches 52 along its periphery so that the wheel may be grasped and rotated either by hand or with a ratchet tool.

Each panel has a pair of cylindrical bores 20 disposed in spaced apart relationship and the sleeve channels 22 and bolt channels 24 extending in opposite directions towards opposing edges 12 of the block 10. Adjacent the bores 20 a latch 54 is fastened. The latch 54 has fingers 56 parallel to the top surface 18 of the block 10 and in spaced apart relationship above the top surface 18. A top clad 58 for hiding the coupling arrangement 32 has a cover side 60 and two elongated spaced apart thin narrow latches 62 for covering the coupling arrangement 32. The latch 62 is mateable with the latch 54 fastened to the block 10.

The block 10 has a central sound proofing accoustical material 70 such as spun fiberglass inset on one side and on the opposite side is upholstered with different accoustical material, in this case with a fabric material 72.

With particular reference to FIG. 1 and FIG. 6, a square upright post 80 is used to join panels 10 at right angles. The post 80 typically comprises a square longitudinal aluminum extrusion having four sides 84. Slits 86 centrally disposed on the sides 84 extending from each end 88 of the post on adjacent sides 84 of the extrusion 82. Longitudinal ribs 90 having limit surfaces 92 enclosing facing edges of the slits 86 extend the length of the interior of the extrusion 82. Abutment surfaces 93 are disposed normal to and between the limit surfaces 92 and each slit 86. Apost coupling assembly 94 is similar to that used to join adjacent panels 10 in juxtaposition, however, only one anchor is used, and typically two shorter bolts including a post bolt 96 are used. The post bolt 96 has a bolt head 98 having a dimension close to that of the limit surfaces 92, which prevents rotation of the post bolt 96. The post bolt 96 bears on the abutment surfaces 93 and when tightened, distributes the tensile load of the coupling assembly to the extrusion 82. To allow adjacent flush placement of the post against the panel 10, the sleeve channel 22 of the panel is substantially the length of the sleeve 42 or a shorter sleeve may be used. In addition to joining panels 10 at right angles, the upright post 80 is also used for aesthetic purposes for terminating a series of juxtaposed panels 10.

With particular reference to FIG. 7, the panels 10 are supported by an arrangement comprising a support plate 100 joined at the bottom surface of the panels 10. The support plate 100 has a slot aperture 102 transverse to the panel 10 for receiving a planar upright support element. A slotted tube 104 has a slot adjacent the support plate 100 and receives a generally triangular planar upright support element 106. The support element 106 has extending lateral protrusions 108 extending through the slot aperture 102 of the support plate 100. A glide 110 is joined to and mates with a lower portion of the tube 104.

In use, two panels 10 to be disposed in juxtaposition are moved physically adjacent one another, with the opposing edges of each block facing each other and the sleeve channels 22 of each of the blocks 10 in straight alignment. The coupling assembly 32 is positioned over the sleeve channels 22 and the wheel 48 is rotated so that the square sleeve 42 causes the spacing between the cylindrical anchors 34 to approximately mate with the bores 20, when the edges 12 are disposed in somewhat spaced apart relationship. Then, the wheel 48 is grasped and the anchors are allowed to drop into the bores 20. The bolts 38 then rest in the bolt channels 24 and the sleeve 42 rests in the sleeve channel 22. The blocks 10 are spaced apart from each other somewhat and the wheel 48 is then rotated using the notches 52, either manually or with a leveraging tool which causes the blocks 10 to move towards each other. Engagement of the recessed surfaces 14 against the wheel 48 prevents further motion and causes the blocks 10 to be tightened. The wheel 48 may be rotated by hand or with a wrench tool to obtain adequate leverage.

To join a pair of panels at right angles, the upright post 80 is brought adjacent one of the panels 10, as shown in FIG. 6. The post coupling assembly 94 is dropped with the anchor fitting within the bore of the panel 10, and the post bolt 96 is dropped in the slit 86 of the extrusion 82. The wheel 48 is rotated causing the sleeve 42 to axially move the post bolt 96 and the bolt 38 extending from the anchor 34 together. The identical fastening is accomplished at the bottom of the post 80 and panel 10.

The panels may be supported by placing the triangular support elements 106 on the tubes 104 which rest on the glides 110. The extending lateral protrusions 108 extend through the slot apertures 102 of the support plate 100, and which runs transverse to the panels 10. For asthetic purposes, a base panel 112 may be joined to the panels 10 and thereby cover exposed portions of the coupling assemblies 32 and also may be used to hide, for example, wiring which may be run underneath the panels 10.

While the invention has been particularly shown and described with reference to a preferred example thereof, it will be understood by those skilled in the art that various changes in form and details may be made therein without departing from the spirit and scope of the invention.

What is claimed is:

1. A modular room divider system comprising:
  first upright panel means for separating an interior space;
  second upright panel means for separating an interior space; and
  coupling assembly means for removably joining the first upright panel means to the second upright panel means, the coupling assembly comprising
  first and second anchor means for removably engaging the first and second panel means respectively, the first anchor means engaged by the first panel means and the second anchor means engaged by the second panel means;
  first and second threaded bolt means for providing an axial coupling to the panel means, the first bolt means laterally joined to the first anchor means and the second bolt means laterally joined to the second anchor means;

elongated threaded sleeve means for axially coupling the first and second bolt means and causing opposing axial movement of the first and second bolt means upon rotation of the threaded sleeve means, the first and second bolt means threadably engaging the sleeve means;

means for rotating the sleeve means to thereby cause opposing motion of the first and second anchor means, whereby a rotation of the sleeve means in one direction causes a joinder of the first and second panel means and a rotation opposite the one direction causes a separation of the panel means; and in which the sleeve means having a first end and a second end and having a first threaded portion adjacent the first end and a second threaded portion oppositely threaded adjacent the second end, the first bolt means having a thread in a first direction mating with the first threaded portion of the sleeve means and the second bolt means having a thread opposite the first direction mating with the second threaded portion of the sleeve means; and the means for rotating the sleeve means is slidable along the sleeve means to allow the means for rotating the sleeve to slide between the first and second panels when the first and second panels are brought together in juxtaposition upon rotation of the sleeve means.

2. The invention as set forth in claim 1 and comprising accoustical padding embedded in the first panel means.

3. A modular room divider system comprising:

a first upright panel for separating an interior space, the first upright panel having an upright edge and a top surface; a second upright panel for separating an interior space, the second upright panel for separating an interior space, the second upright panel having an upright edge and a top surface;

a first coupling assembly removably joining the first upright panel to the second upright panel, the coupling assembly comprising a first anchor having a dimension transverse to the first upright panel for removably engaging the first panel;

a second anchor having a dimension transverse to the second upright panel for removably engaging the second panel;

a first threaded bolt having a first thread direction laterally joined to the first anchor, the first threaded bolt having a diameter, the transverse dimension of the first anchor greater than the diameter of the first bolt to provide a stress relief across the transverse dimension of the anchor;

a second threaded bolt having a thread opposite the first thread direction laterally joined to the second anchor, the second threaded bolt having a diameter, the transverse dimension of the second anchor greater than the diameter of the second bolt to provide a stress relief across the transverse dimension of the anchor;

an elongated threaded sleeve for axially coupling the first and second bolts and for causing opposing axial movement of the ; first and second bolt means upon rotation of the threaded sleeve, the first and second bolts threadably engaging the sleeves; and means for rotating the sleeve to thereby cause opposing motion of the first and second anchors, whereby a rotation of the sleeve in one direction causes a joinder of the first and second panels and a rotation opposite the one direction causes a separation of the first and second panels;

the first bolt having a thread in a first direction and the second bolt having a thread in the second direction;

the first panel defining an anchor aperture extending from the top surface for removably receiving the first anchor; and the first panel defines channel means for receiving a portion of the coupling assembly in the panel, the channel means communicating between the anchor aperture and the edge of the first panel, whereby the anchor and anchor apertures limit axial travel of the panel with respect to the first bolt; and in which the means for rotating the sleeve comprises a generally planar wheel having a central aperture, and the sleeve having an exterior prismoidal surface, the central aperture mating with the exterior prismoidal surface to rotate the sleeve upon rotation of the wheel, the wheel movable laterally along the axis of the sleeve about the exterior prismoidal surface.

4. The invention as set forth in claim 3 and in which the wheel comprises a plurality of notches circumferentially spaced about the wheel for leveraged rotation of the sleeve; and in which the first panel comprises a surface recessed from the edge surface to receive the wheel and allow joinder of the edges while providing clearance for the wheel.

5. The invention as set forth in claim 3 or 4 and comprising a clad for covering the coupling assembly, latch means disposed on the top surface of the first panel, and means disposed on the clad matable with the latch means for removably joining the cover block to the top of the first panel; and further comprising accoustical sound proofing material joined to the first panel.

6. The invention as set forth in claims 3 or 4 and in which the first coupling assembly joins the first and second panels adjacent the top surfaces of the first and second panels, the first and second panels each having bottom surfaces and the system comprises a second coupling assembly removably joining the first upright panel to the second upright panel adjacent the bottom surfaces.

7. A modular room divider system of the type having a plurality of movable panels, each having accoustical padding joined thereto, comprising:

a first upright panel for separating an interior space, the first upright panel having an upright edge and a top surface;

a second upright panel for separating an interior space, the second upright panel having an upright edge and a top surface;

a coupling assembly for removably joining the first upright panel to the second upright panel, the coupling assembly comprising:

a first anchor for removably engaging the first panel;

a second anchor for removably engaging the second panel;

a first threaded bolt laterally joined to the first anchor;

a second threaded bolt laterally joined to the second anchor;

an elongated threaded sleeve for axially coupling the first and second bolts and for causing opposing axial movement of the first and second bolt means upon rotation of the threaded sleeve, the threaded sleeve having opposing ends, the first and second bolts threadably engaging the opposing ends, the threads of the first and second bolts oppositely directed;

means for rotating the sleeve to thereby cause opposing motion of the first and second anchors, whereby a rotation of the sleeve in one direction causes a joinder of the first and second panels and a rotation opposite the one direction causes a separation of the first and second panels; and in which the first panel defines an aperture extending from the top surface for removably receiving the first anchor, and the first panel defining bolt channel means for receiving the first and second bolts adjacent the top surface and sleeve channel means for receiving the sleeve adjacent the top surface, the channel means communicating between the anchor aperture and the edge of the first panel, whereby the anchor and the anchor aperture limit axial travel of the panel along the first bolt; and the means for rotating the sleeve comprises a generally planar wheel having a central aperture, the sleeve having an exterior prismoidal surface, the central aperture mating with the exterior prismoidal surface to rotate the sleeve upon rotation of the wheel, the wheel moveable laterally along the axis of the sleeve about the exterior prismoidal surface.

8. The invention as set forth in claim 7 and in which:
the wheel comprises a plurality of notches circumferentially spaced about the wheel for leverage rotation of the sleeve;

the first panel comprises an upright surface normal to the top surface and recessed from the edge surface to provide clearance for receiving the wheel and allowing flush joinder of the edges; and the system further comprising:

a clad for covering the coupling assembly and the top surface of the first panel and latch means for coupling the clad to the first panel, comprising a panel fastener disposed on the top surface of the first panel, and a clad fastener disposed on the clad mateable with the panel fastener for removably joining the clad to the top of the first panel.

9. The invention as set forth in claim 8 and and which the first and second panels comprise bottom surfaces and comprising means coupled to the bottom surfaces for supporting the first and second panels, the supporting means comprising:

base plate means for receiving an upright support, the base plate means joined to the bottom surface of the first panel;

tube means for providing an upright support to the first panel, disposed upright and adjacent to the base plate;

glide means coupled to the tube means for supporting the tube means, the glide means coupled to the tube in spaced apart relationship to the base plate; and means for coupling the tube to the base plate.

10. The invention as set forth in claims 7, 8 or 9 and comprising:

a second coupling assembly for removably joining the first upright panel to the second upright panel adjacent the bottom surfaces of the first and second panels, the coupling assembly comprising:

a first anchor for removably engaging the first panel;

a second anchor for removably engaging the second panel;

a first threaded bolt laterally joined to the first anchor;

a second threaded bolt laterally joined to the second anchor;

a elongated threaded sleeve for axially coupling the first and second bolts and for causing opposing axial movement of the first and second bolt means upon rotation of the threaded sleeve, the threaded sleeve having opposing ends, the first and second bolts threadably engaging the opposing ends, the threads of the first and second bolts oppositely directed; and means for rotating the sleeve to thereby cause opposing motion of the first and second anchors, whereby a rotation of the sleeve in one direction causes a joinder of the first and second panels and a rotation opposite the one direction causes a separation of the first and second panels.

11. A modular room divider system comprising:
a first upright panel for separating an interior space, the first upright panel having an upright edge and a top surface;

post means for joining the first upright panel in juxtaposition; and a post coupling assembly removably joining the first upright panel to the post means, the post coupling assembly comprising a first anchor having a dimension transverse to the first upright panel for removably engaging the first panel;

a first bolt laterally joined to the first anchor and having a first thread direction, the first threaded bolt having a diameter, the transverse dimension of the first anchor greater than the diameter of the first bolt to provide a stress relief across the transverse dimension of the anchor;

a post bolt having a thread opposite the first thread direction, the post means comprising means for retaining the post bolt;

an elongated threaded sleeve for axially coupling the first bolt and the post bolt and for causing opposing axial movement of the first bolt and the post bolt means upon rotation of the threaded sleeve, the first bolt and the post bolt threadably engaging the sleeve; and means for rotating the sleeve to thereby cause opposing motion of the first anchor and the post means, whereby a rotation of the sleeve in one direction causes a joinder of the first panel and the post means and a rotation opposite the one direction causes a separation of the first panel and the post means, the means for rotating the sleeve slidable along the sleeve to allow the means for rotating the sleeve to slide between the first upright panel and the post means when the first upright panel and the post means are brought together in juxtaposition upon rotation of the sleeve.

12. The invention as set forth in claim 11 and comprising a second upright panel for separating an interior space, the second upright panel having an upright edge and a top surface, the second upright panel disposed normal to the first upright panel and joined to the post means.

13. The invention as set forth in claim 11 and in which the post means comprises slot means for receiving a bolt, the slot means adjacent a top surface of the first panel, and longitudinal guide means disposed on opposite sides of the slot means for limiting rotation of the bolt, the second bolt disposed through the slot means, as limited by the guide means, whereby a rotation of the sleeve in one direction causes movement of the post means towards the sleeve and the first panel.

14. A modular room divider coupling assembly comprising:
- a first anchor for engaging a room divider panel;
- a second anchor for engaging a different room divider panel;
- a first bolt extending from and laterally joined to the first anchor, the first bolt having a right hand thread;
- a second bolt extending from and laterally joined to the second anchor, the second bolt having a left hand thread;
- an elongated sleeve having right and left hand threaded portions, the right hand threaded portion mating with the right hand thread of the first bolt, the left hand threaded portion mating with the left hand thread of the second bolt, the sleeve for causing opposing axial movement of the first and second bolts upon rotation of the sleeve; and
- means for rotating the sleeve to thereby cause opposing motion of the first and second anchors, whereby a rotation of the sleeve in one direction causes movement of both the first and second anchors towards the sleeve;
- the first and second apertures define transverse countersunk bolt apertures for receiving the bolt in fixed relationship;
- the sleeve has a prismoidal exterior surface;
- the sleeve rotating means comprises a wheel having a central aperture mating with and movable over the prismoidal exterior surface; and
- means for coding the anchors to distinguish the anchor having a right hand threaded bolt from a left hand threaded bolt.

* * * * *